US012451570B2

(12) United States Patent
Fernandez-Galindo et al.

(10) Patent No.: US 12,451,570 B2
(45) Date of Patent: Oct. 21, 2025

(54) TRACTION BATTERY ASSEMBLY HAVING BATTERY PACK MODULE AND SENSE LEAD HEADER AND CONNECTING METHOD

(71) Applicant: Ford Global Technologies, LLC, Dearborn, MI (US)

(72) Inventors: Francisco Fernandez-Galindo, Canton, MI (US); Daniel Paul Roberts, Livonia, MI (US); Nihar Kotak, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 514 days.

(21) Appl. No.: 17/340,234

(22) Filed: Jun. 7, 2021

(65) Prior Publication Data
US 2022/0393318 A1    Dec. 8, 2022

(51) Int. Cl.
*H01M 50/569*    (2021.01)
*B60K 1/04*    (2019.01)
(Continued)

(52) U.S. Cl.
CPC ....... *H01M 50/569* (2021.01); *H01M 10/425* (2013.01); *H01M 10/482* (2013.01); *H01M 10/486* (2013.01); *H01M 50/249* (2021.01); *H01M 50/262* (2021.01); *H01M 50/271* (2021.01); *H01M 50/502* (2021.01);
(Continued)

(58) Field of Classification Search
CPC ............. B60K 1/04; B60K 2001/0438; H01M 10/425; H01M 10/482; H01M 10/486; H01M 50/249; H01M 50/262; H01M 50/271; H01M 50/502; H01M 50/519;
(Continued)

(56) References Cited

U.S. PATENT DOCUMENTS 10,629,965 B2   4/2020 Lee et al.
2010/0250043 A1* 9/2010 Scheucher ............ H01M 50/20
                                                     701/22

(Continued)

FOREIGN PATENT DOCUMENTS

CN    104979522 A    10/2015
WO    2014107094 A1  7/2014

OTHER PUBLICATIONS

What is a Thermistor and how does it work? Date accessed: Aug. 17, 2022 https://web.archive.org/web/20210507003252/https://www.omega.com/en-us/resources/thermistor (Year: 2021).*

*Primary Examiner* — Matthew T Martin
*Assistant Examiner* — Jared Hansen
(74) *Attorney, Agent, or Firm* — David B. Kelley; Carlson, Gaskey & Olds, P.C.

(57) ABSTRACT

A traction battery assembly includes, among other things, an array sense lead header of a battery array, a plurality of sense leads extending from the array sense lead header to areas of the battery array, and a battery pack module having a module connector. The battery pack module is configured to move relative to the battery array from a disengaged position where the module connector the array sense lead header are disengaged to an engaged position where the module connector and the array sense lead header are engaged.

20 Claims, 4 Drawing Sheets

(51) Int. Cl.
    *H01M 10/42*     (2006.01)
    *H01M 10/48*     (2006.01)
    *H01M 50/249*    (2021.01)
    *H01M 50/262*    (2021.01)
    *H01M 50/271*    (2021.01)
    *H01M 50/502*    (2021.01)
    *H01M 50/519*    (2021.01)

(52) U.S. Cl.
    CPC .............. *H01M 50/519* (2021.01); *B60K 1/04* (2013.01); *B60K 2001/0438* (2013.01); *H01M 2010/4271* (2013.01); *H01M 2010/4278* (2013.01); *H01M 2220/20* (2013.01)

(58) Field of Classification Search
    CPC ....... H01M 50/569; H01M 2010/4271; H01M 2010/4278; H01M 2220/20
    See application file for complete search history.

(56) References Cited

U.S. PATENT DOCUMENTS

| | | | | |
|---|---|---|---|---|
| 2017/0200929 | A1* | 7/2017 | Acikgoez | H01M 10/425 |
| 2020/0091494 | A1* | 3/2020 | Fernandez-Galindo | G01R 31/36 |
| 2020/0185683 | A1* | 6/2020 | Roberts | H05K 1/189 |
| 2021/0057708 | A1* | 2/2021 | Castillo | H01M 10/647 |
| 2022/0344730 | A1* | 10/2022 | Oga | H01M 10/482 |

\* cited by examiner

TRACTION BATTERY ASSEMBLY HAVING BATTERY PACK MODULE AND SENSE LEAD HEADER AND CONNECTING METHOD

TECHNICAL FIELD

This disclosure relates generally to connecting a battery pack module to a sense lead header of a traction battery.

BACKGROUND

Electrified vehicles differ from conventional motor vehicles because electrified vehicles can be driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

SUMMARY

A traction battery assembly according to an exemplary aspect of the present disclosure includes, among other things, an array sense lead header of a battery array, a plurality of sense leads extending from the array sense lead header to areas of the battery array, and a battery pack module having a module connector. The battery pack module is configured to move relative to the battery array from a disengaged position where the module connector the array sense lead header are disengaged to an engaged position where the module connector and the array sense lead header are engaged.

In another example of the foregoing traction battery assembly, the battery pack module is configured to slide relative to the array sense lead header from the disengaged position to the engaged position.

Another example of any of the foregoing traction battery assemblies includes at least one communication line extending from the battery pack module to a battery electronic control module.

In another example of any of the foregoing traction battery assemblies, the battery pack module is a battery pack sensing module.

Another example of any of the foregoing traction battery assemblies includes an array cover of the battery array. The array sense header is disposed on the array cover.

Another example of any of the foregoing traction battery assemblies includes at least one mechanical fastener that secures the battery pack module to the array cover when the battery pack module is in the engaged position with the array sense lead header.

In another example of any of the foregoing traction battery assemblies, the array cover is a top plate of the battery array.

Another example of any of the foregoing traction battery assemblies includes an array cover of the battery array. The array cover has an aperture that receives the battery pack module when the battery pack module is in the engaged position with the array sense lead header.

In another example of any of the foregoing traction battery assemblies, the array cover defines an entire circumferential perimeter of the aperture such that the aperture is circumferentially continuous.

In another example of any of the foregoing traction battery assemblies, the module connector is within the battery array and array covered by the array cover.

Another example of any of the foregoing traction battery assemblies includes a traction battery pack having the battery array.

In another example of any of the foregoing traction battery assemblies, the plurality of sense leads include at least one voltage sense lead and at least one temperature sense lead.

Another example of any of the foregoing traction battery assemblies includes a thermistor connected to each temperature sense lead.

A traction battery module connecting method according to yet another exemplary aspect of the present disclosure includes, among other things, transitioning a module connector of a battery pack module from a disengaged position with an array sense lead header of a battery array to an engaged position with the array sense lead header. The array sense lead header is coupled to a plurality of sense leads extending from the array sense lead header to areas of the battery array.

Another example of the foregoing method includes using the battery pack module to process data provided through the plurality of sense leads.

Another example of any of the foregoing methods includes transitioning by sliding the module connector from the disengaged position to the engaged position.

In another example of any of the foregoing methods, the module connector is secured directly to a circuit board assembly of the battery pack module.

Another example of any of the foregoing methods includes communicating data processed by the battery pack module to a battery electronic control module of a traction battery pack.

Another example of any of the foregoing methods includes receiving the module connector within an aperture of an array cover of the battery array during the transitioning.

In another example of any of the foregoing methods, the plurality of sense leads include at least one voltage sense lead and at least one temperature sense lead.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure is directed toward connecting a battery pack module to a sense lead header of a traction battery. The connecting can occur without a jumper wire harness between the battery pack module and the sense lead header.

Figure 1:
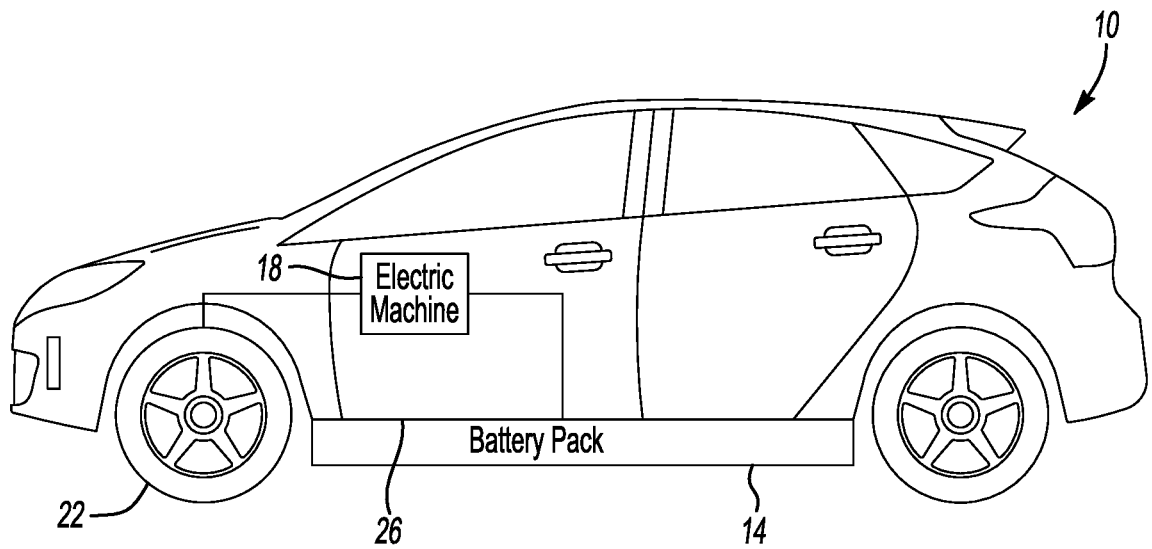
FIG. 1 shows a side view of an electrified vehicle having a battery pack according to an exemplary aspect of the present disclosure.

With reference to FIG. 1, an electrified vehicle 10, in an exemplary non-limiting embodiment, includes a traction battery pack 14 that powers an electric machine 18. The electrified vehicle 10 further includes wheels 22 driven by the electric machine 18. The battery pack 14 can power the electric machine 18, which converts electric power to torque to drive the wheels 22.

The battery pack 14 is, in the exemplary embodiment, secured to an underbody 26 of the electrified vehicle 10. The battery pack 14 could be located elsewhere on the electrified vehicle 10 in other examples. The battery pack 14 can be secured to the underbody 26 using straps and mechanical fasteners, for example.

The electrified vehicle 10 is an all-electric vehicle. In other examples, the electrified vehicle 10 is a hybrid electric vehicle, which can selectively drive wheels using torque provided by an internal combustion engine instead, or in addition to, an electric machine. Generally, the electrified vehicle 10 could be any type of vehicle having a traction battery pack.

Figure 2:
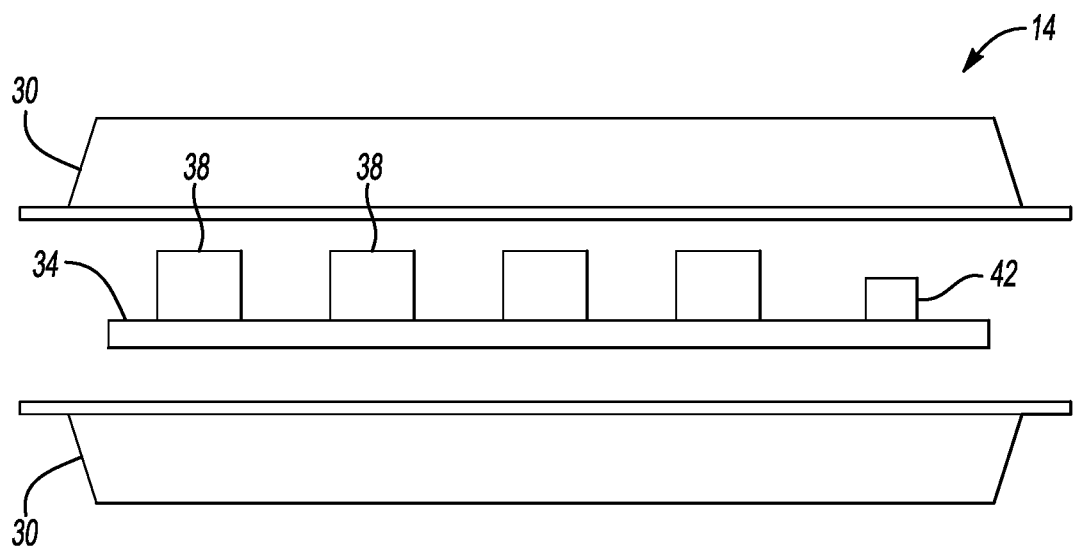
FIG. 2 illustrates a partially expanded view of the battery pack from FIG. 1.

Referring now to FIG. 2, the battery pack 14 includes an enclosure 30 that encloses a plurality of battery the battery arrays 38 and a cold plate 34. The battery the battery arrays 38 are disposed on the cold plate 34. The battery the battery arrays 38 can each include a plurality of individual battery cells disposed along an axis. A liquid coolant can circulate through the cold plate 34 to cool the battery arrays 38 and other components of the battery pack.

The battery pack 14 further includes a battery energy control module (BECM) in communication with the battery arrays 38. The BECM 42 can, for example, monitor battery cell voltage, current, and temperature. The BECM 42 either directly or indirectly controls charge current or load current going into or out of the battery arrays 38.

The BECM 42 is part of a battery management system that can include various modules and connectors utilized to communicate and monitor the individual battery cells 58 and other areas of the battery array 38. As examples, the battery management system can include a battery pack sensing module (BPSM) 50 associated with each battery array 38.

Many battery packs now utilize distributed battery management systems to measure and monitor battery cell voltage, current, temperature, etc. Distributed battery management systems include components, such as the BPSM 50, mounted directly to the battery arrays 38. Within the distributed battery management system, the BPSM 50 includes circuitry that connects to sense leads associated with the respective battery array 38. In contrast, a battery pack having a centralized architecture may extend sense leads from each of the battery arrays all the way to a centralized BPSM that contains circuitry.

Figure 3:
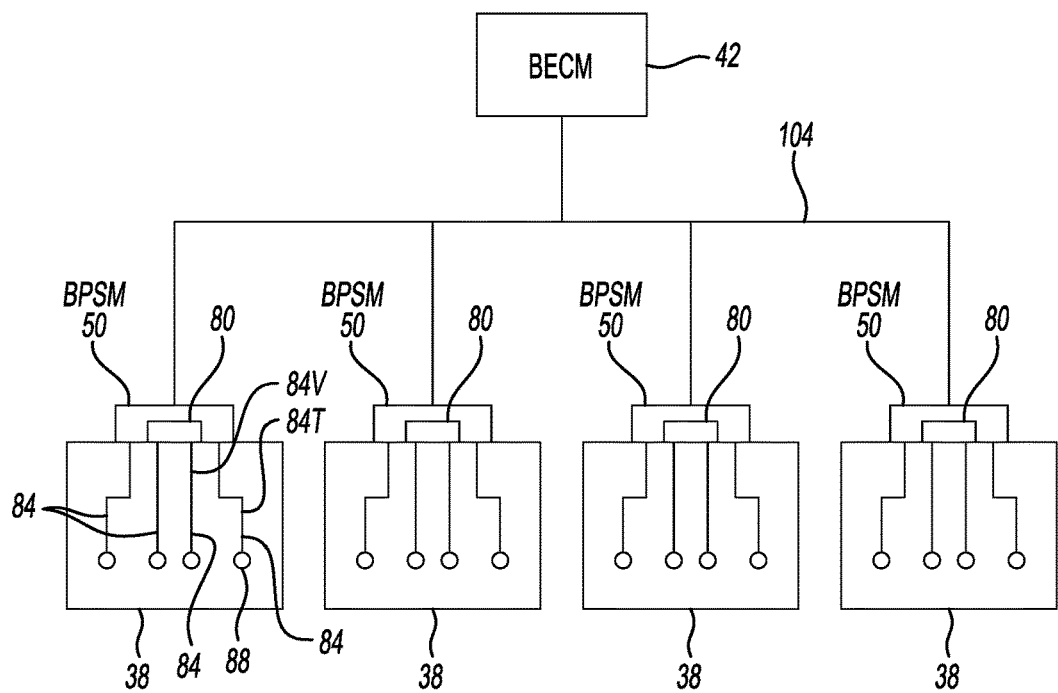
FIG. 3 illustrates a highly schematic view of selected portions of the battery pack of FIG. 2 showing a battery management system of the battery pack.

As shown in FIG. 3, the example battery pack 14 has a distributed architecture. In particular, the battery pack 14 includes the BECM 42, the BPSMs 50, and communication lines 104 that operably couple the BECM 42 to the BPSMs 50.

Figure 4:
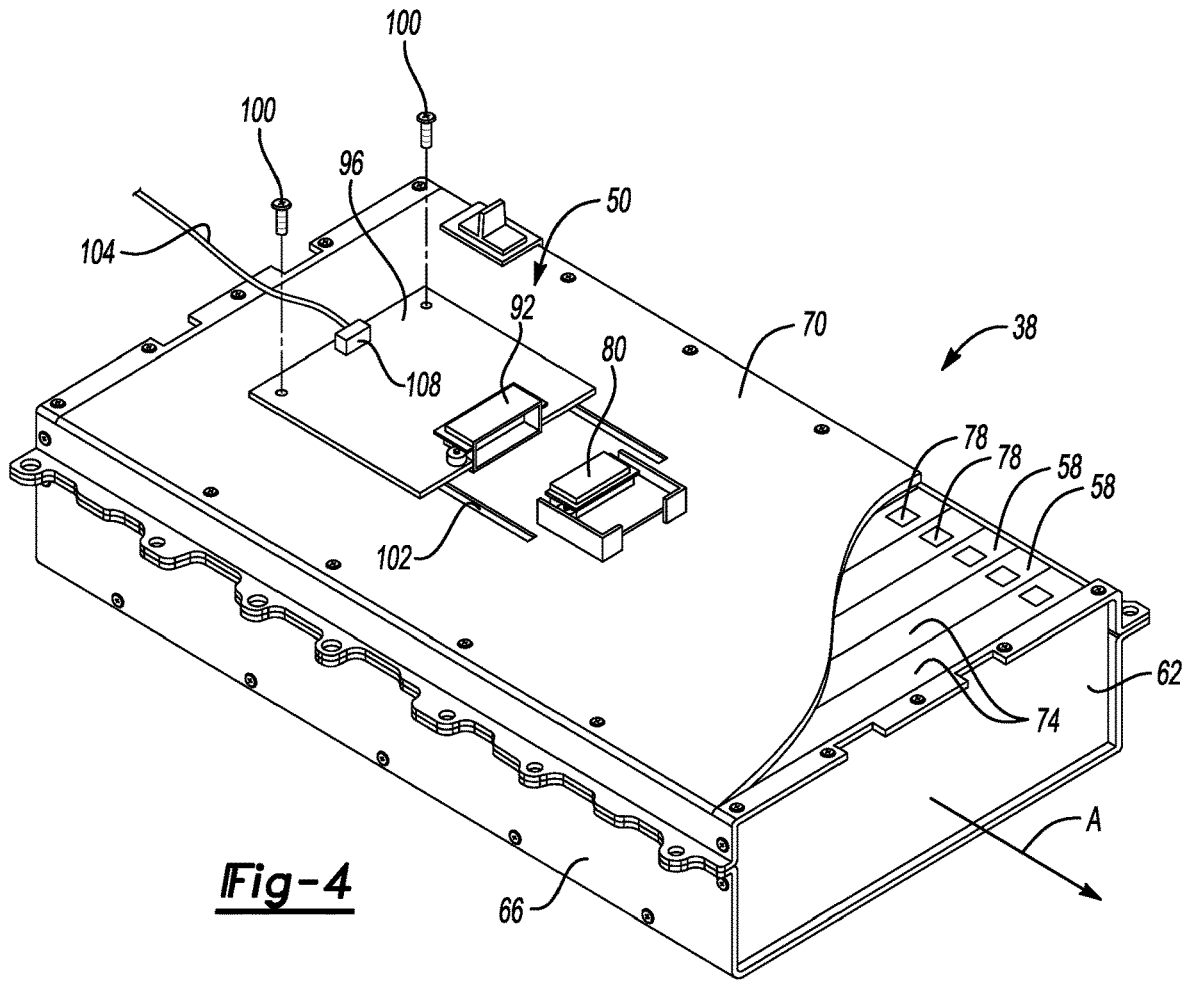
FIG. 4 illustrates a perspective view of a battery array from the battery pack of FIG. 2 with a battery pack module shown in a disengaged position according to an exemplary embodiment.
Figure 5:
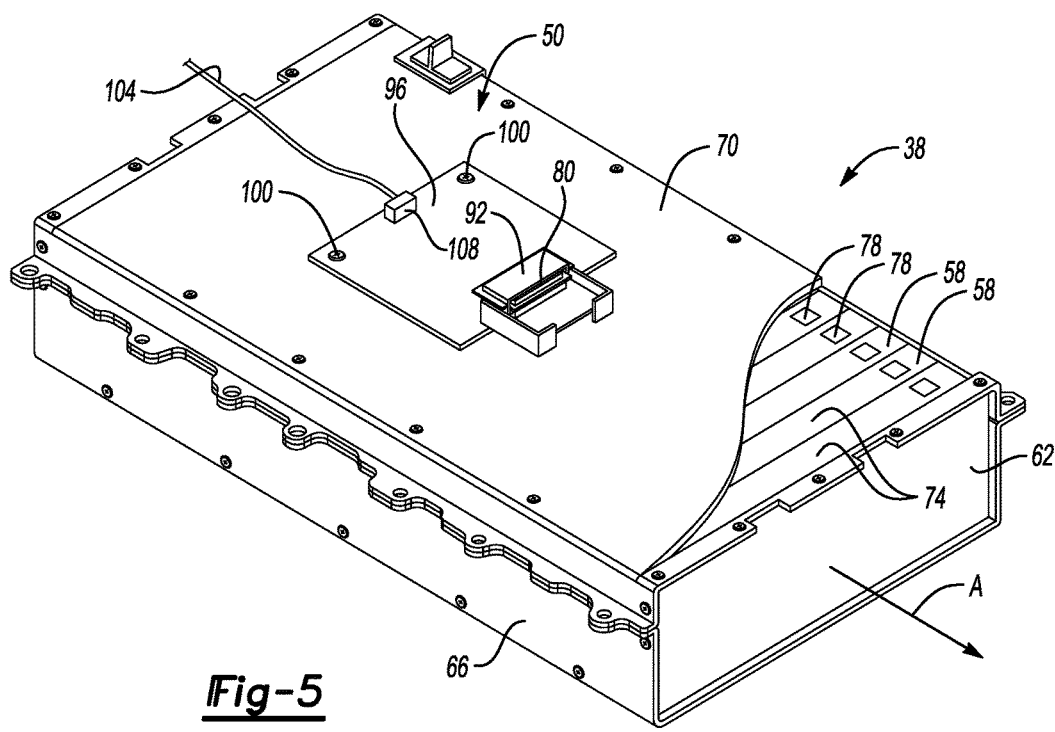
FIG. 5 illustrates a perspective view of the of FIG. 4 showing the battery pack module in an engaged position.

With reference now to FIGS. 4 and 5 and continuing reference to FIG. 3, the battery arrays 38 each include a plurality of individual battery cells 58 disposed along an axis A between opposing end plates 62. Side plates 66 are disposed along opposing laterally facing sides of the battery cells 58. A top plate 70 array covers upper surfaces 74 of the battery cells 58. Terminals 78 of the battery cells 58 extend through the upper surfaces 74 of the battery cells 58 in this example. For purposes of this disclosure, "upper" is with reference to ground and an ordinary orientation of the battery cells 58 when the battery pack 14 is within the electrified vehicle 10 of FIG. 1.

The top plate 70 is an array cover because the top plate 70 array covers at least the upper surfaces 74 of the battery cells 58. The end plates 62 and side plates 66 are also array covers in this example.

Each battery array 38 includes an array sense lead header 80 that is integrated with the respective battery array 38. In this example, the array sense header 80 is disposed on the top plate 70. In other examples, the sense lead header is disposed on another array cover of the battery array 38.

A plurality of sense leads 84 (FIG. 3) extend from the array sense lead header 80 to areas of the battery array 38. The plurality of sense leads 84 include at least one voltage sense lead 84V and at least one temperature sense lead 84T. A thermistor 88 can be connected to each temperature sense lead 84T.

The BPSM 50 includes, among other things, a module connector 92 and a circuit board assembly 96. The circuit board assembly 96 can be an FR-4 type printed circuit board assembly.

The BPSM 50 is configured to move relative to the respective battery array 38 from a disengaged position (FIG. 4) where the module connector 92 and the array sense lead header 80 are disengaged to an engaged position (FIG. 5) where the module connector 92 and the array sense lead header 80 are engaged.

In this example, the BPSM 50 is configured to slide relative to the array sense lead header 80 from the disengaged position to the engaged position in one motion. After the BPSM 50 has moved to the engaged position, one or more mechanical fasteners 100 can be used to secure the BPSM 50 to the top plate 70. Snap-fit fasteners could be used to secure the BPSM 50 to the top plate 70 instead of, or in addition to, mechanical fasteners 100.

The battery array 38 can include structures, such as guides 102 within the top plate 70. The guides 102 can help to guide and align the BPSM 50 when transitioning to the engaged position and help to error-proof the engagement of the BPSM 50.

The module connector 92 and the array sense lead header 80 are pin-type connectors in this example. Data from the sense leads 84, such as data indicating temperatures and voltages of the battery array 38, is communicated through the array sense lead header 80 to the module connector 92. The circuit board assembly 96 of the BPSM 50 can, in this example, read analog signal data and convert the data to a digital data stream. This data stream can be read by BECM 42. BECM 42 can also issue commands to the BPSM 50 to perform specific tasks for example cell balancing or waking up the BPSM from sleep.

Communication lines 104 are utilized to communicate information processed by the circuit board assembly 96 of the BPSM 50 to the BECM 42 of the battery pack 14. The communication lines 104 can communicate information obtained from the plurality of different sense leads 84. In the exemplary embodiment, there are fewer lines or leads extending from the battery arrays 38 to the BECM 42 of the battery pack 14 than in designs lacking BPSMs where the sense leads extend all the way to the BECM. The modular approach of the exemplary embodiment can thus reduce wiring complexity.

In this example, the communication lines 104 are wires. In other examples, the communications between the circuit board assembly 96 of the BPSM 50 and the BECM 42 could be wireless communications. That is, the communication lines 104 may not require physical wires extending all the way from the BPSM 50 to the BECM 42.

The communication lines, in the exemplary embodiment, can be to "daisy chained" together with the communication lines 104 of another one of the battery arrays 38 within the battery pack 14. The circuit board assembly 96, in the exemplary embodiment, includes a daisy chain header 108 that connects to the communication lines 104 to "daisy chain" together the circuit board assembly 96 of one of the battery arrays 38 with another circuit board assembly on another of the battery arrays 38.

The battery management system of the battery pack 14, which includes the BPSMs 50, can balance the battery cells 58 by selectively adjusting a state of charge of one or more battery cells 58 within a given one of the battery arrays 38 to bring the state of charge closer to other battery cells 58 within that battery array 38. Resistors of the BPSMs 50 can be used to help balance the battery cells 58. In the past centralized battery management systems, cell balance resistors were within a central BECM rather than distributed downstream to the battery arrays.

During operation, thermal energy levels within the circuit board assembly 96 can increase due to, among other things, the operation of the resistors of the circuit board assembly. Many battery packs now incorporate distributed battery management systems to measure and monitor battery cell voltage, current, temperature, etc. Distributed battery management systems include components, such as the BPSM, mounted directly to the battery arrays 38.

For example, a battery pack having a distributed architecture can include circuitry mounted to individual battery arrays. The circuitry is connected to sense leads associated with that battery array. In contrast, a battery pack having a centralized architecture may extend sense leads from each of the battery arrays all the way to a centralized BPSM that contains circuitry.

In this example, the battery pack 14 has a distributed architecture and includes battery management system electronics mounted to the top plate 70 of each of the battery arrays 38. The electronics can be used to measure and monitor status information such as voltage, current, temperature, etc.

The battery management system of the battery pack 14 can balance the battery cells 58 by selectively adjusting a state of charge of one or more battery cells 58 within a given one of the battery arrays 38 to bring the state of charge closer to other battery cells 58 within that battery array 38. Resistors can be used to help balance the battery cells 58.

In the past, cell balance resistors have been housed in a central BECM that has sufficient cooling capability to reject the generated heat energy. The distributed architecture of the battery pack 14 can mean that resistors used in balancing are secured to the battery array 38 rather than housed in a centralized control module that is located within the battery pack 14, but spaced from the battery arrays 38.

Figure 6:
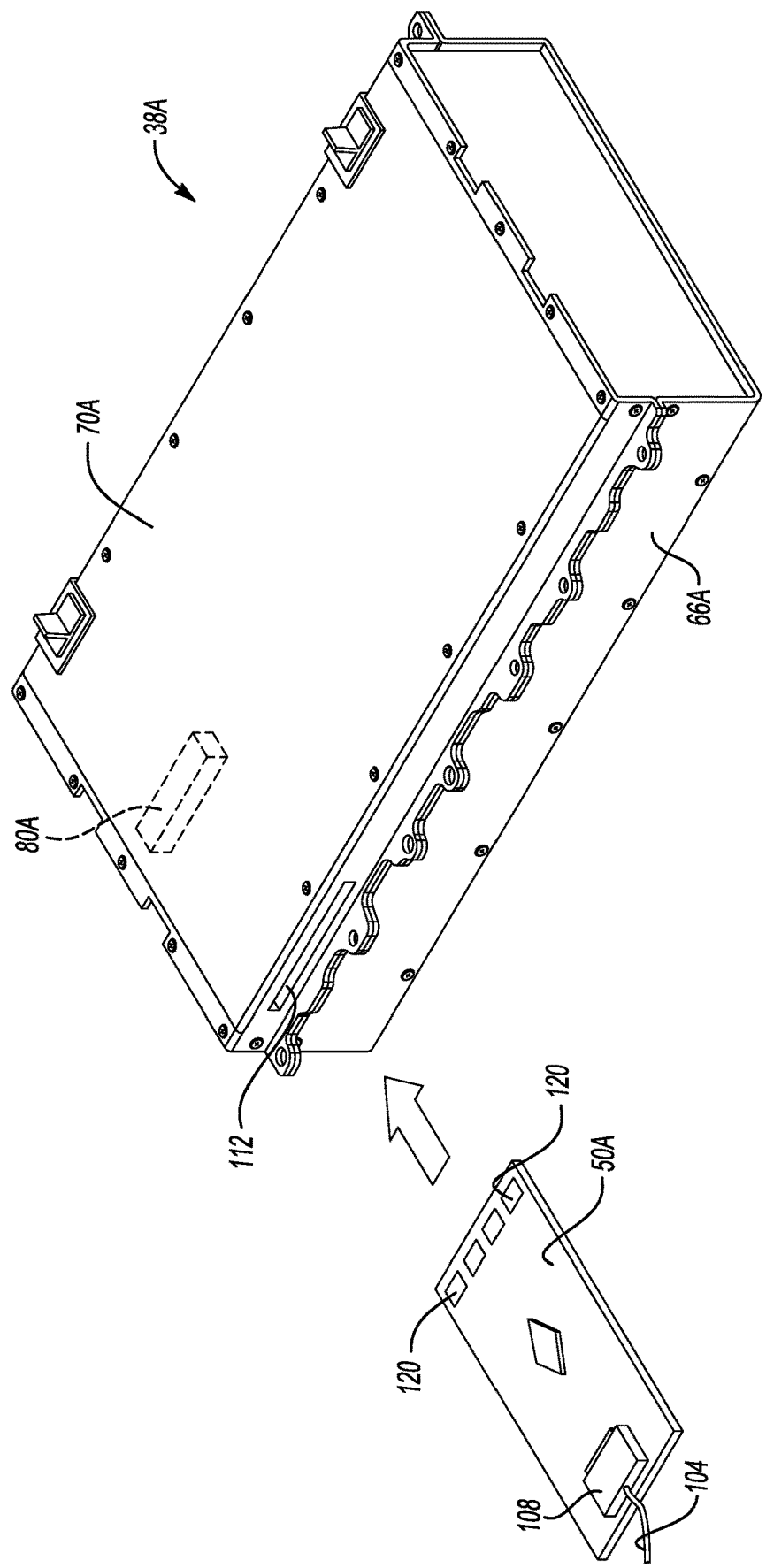
FIG. 6 illustrates a perspective view of a battery array from the battery pack of FIG. 2 showing a battery pack module in a disengaged position according to another exemplary embodiment.

With reference to FIG. 6, another example battery pack includes a battery array 38A having an array sense lead header 80A that internal to the battery array 38A and is array covered by the side wall 66A and a top plate 70A.

The side wall 66A has an aperture 112 that receives a BPSM 50A when the BPSM 50A is moved to the engaged position with the array sense lead header 80A. The BPSM 50A can slide into the aperture 112. Contacts 120 of the BPSM 50A can operatively connect the BPSM 50A to the array sense lead header 80A when the BPSM 50A is in the engaged position. The top plate 70A can be installed, and the BPSM 50A then moved to the engaged position.

In this example, the side wall 66A, which is a type of array cover, defines an entire circumferential perimeter of the aperture 112 such that the aperture 112 is circumferentially continuous.

Features of the disclose examples includes a system that facilitates quick and reliable engagement of a module header of a module connector with an array sense lead header. The module header can slide relative to the array sense lead header to transition the module header to an engaged position with the array sense header. The disclosed embodiments can be used to eliminate lines and wiring with a traction battery pack, such as a jumper connecting array sense lead headers to a BPSM, and sense lead wiring extending from within a battery array to a BECM of the battery pack. Eliminating these components can reduce weight.

The module header's chance of damage during assembly is lessened as a flexible PCB header and connector may not be required.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery assembly, comprising:
   an array sense lead header of a battery array;
   a plurality of sense leads extending from the array sense lead header to areas of the battery array; and
   a battery pack module having a module connector, the battery pack module configured to move relative to the battery array from a disengaged position where the module connector and the array sense lead header are disengaged to an engaged position where the module connector and the array sense lead header are engaged.

2. The traction battery assembly of claim 1, wherein the battery pack module is configured to slide relative to the array sense lead header from the disengaged position to the engaged position.

3. The traction battery assembly of claim 1, further comprising at least one communication line extending from the battery pack module to a battery electronic control module.

4. The traction battery assembly of claim 1, wherein the battery pack module is a battery pack sensing module.

5. The traction battery assembly of claim 1, further comprising an array cover of the battery array, the array sense header disposed on the array cover.

6. The traction battery assembly of claim 5, further comprising at least one mechanical fastener that secures the battery pack module to the array cover when the battery pack module is in the engaged position with the array sense lead header.

7. The traction battery assembly of claim 5, wherein the array cover is a top plate of the battery array.

8. The traction battery assembly of claim 1, further comprising an array cover of the battery array, the array cover having aperture that receives the battery pack module when the battery pack module is in the engaged position with the array sense lead header.

9. The traction battery assembly of claim 8, wherein the array cover defines an entire circumferential perimeter of the aperture such that the aperture is circumferentially continuous.

10. The traction battery assembly of claim 8, wherein the module connector is within the battery array and array covered by the array cover.

11. The traction battery assembly of claim 1, further comprising a traction battery pack having the battery array.

12. The traction battery assembly of claim 1, wherein the plurality of sense leads include at least one voltage sense lead and at least one temperature sense lead.

13. The traction battery assembly of claim 11, further comprising a thermistor connected to each temperature sense lead.

14. A traction battery module connecting method, comprising:
   transitioning a module connector of a battery pack module from a disengaged position with an array sense lead header of a battery array to an engaged position with the array sense lead header,
   the array sense lead header coupled to a plurality of sense leads extending from the array sense lead header to areas of the battery array.

15. The traction battery module connecting method of claim 14, further comprising using the battery pack module to process data provided through the plurality of sense leads.

16. The traction battery module connecting method of claim 14, further comprising transitioning by sliding the module connector from the disengaged position to the engaged position.

17. The traction battery module connecting method of claim 14, wherein the module connector is secured directly to a circuit board assembly of the battery pack module.

18. The traction battery module connecting method of claim 14, further comprising communicating data processed by the battery pack module to a battery electronic control module of a traction battery pack.

19. The traction battery module connecting method of claim 14, further comprising receiving the module connector within an aperture of an array cover of the battery array during the transitioning.

20. The traction battery module connecting method of claim 14, wherein the plurality of sense leads include at least one voltage sense lead and at least one temperature sense lead.

* * * * *